(12) United States Patent
Iriyama et al.

(10) Patent No.: US 12,537,982 B2
(45) Date of Patent: Jan. 27, 2026

(54) COMMUNICATION METHOD AND SYSTEM

(71) Applicant: YAMAHA CORPORATION, Hamamatsu (JP)

(72) Inventors: Tatsuya Iriyama, Hamamatsu (JP); Satoshi Ukai, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 51 days.

(21) Appl. No.: 18/192,828

(22) Filed: Mar. 30, 2023

(65) Prior Publication Data

US 2023/0239520 A1 Jul. 27, 2023

Related U.S. Application Data

(63) Continuation of application No. PCT/JP2021/037184, filed on Oct. 7, 2021.

(30) Foreign Application Priority Data

Oct. 9, 2020 (JP) .................. 2020-171116

(51) Int. Cl.
*H04N 21/233* (2011.01)

(52) U.S. Cl.
CPC .................. *H04N 21/233* (2013.01)

(58) Field of Classification Search
CPC ....... H04L 67/00; H04M 11/00; H04M 11/08; H04M 3/56; H04N 21/233; H04N 21/43079; H04N 21/439; H04N 21/4788; H04N 21/8106
See application file for complete search history.

(56) References Cited

U.S. PATENT DOCUMENTS

| | | | | |
|---|---|---|---|---|
| 2015/0221339 A1* | 8/2015 | Snibbe | ............ | H04N 21/23424 386/285 |
| 2021/0389868 A1* | 12/2021 | Crowder | ............... | A63F 13/285 |

FOREIGN PATENT DOCUMENTS

| CN | 108124114 A | | 6/2018 |
|---|---|---|---|
| CN | 110113256 A | | 8/2019 |
| JP | H0926796 A | | 1/1997 |
| JP | 2008305435 A | * | 12/2008 |
| JP | 2013150095 A | | 8/2013 |
| JP | 2015005940 A | | 1/2015 |
| JP | 2019092186 A | | 6/2019 |

OTHER PUBLICATIONS

English translation of Written Opinion issued in Intl. Appln. No. PCT/JP2021/037184 mailed Dec. 21, 2021, previously cited in IDS filed Mar. 30, 2023.

(Continued)

*Primary Examiner* — Omar S Parra
(74) *Attorney, Agent, or Firm* — ROSSI, KIMMS & McDOWELL LLP (57) ABSTRACT

A first terminal transmits first event data instructing generation of a first sound to a server. A second terminal transmits second event data instructing generation of a second sound to the server. The server transmits data including the first event data and the second event data to the first terminal. The first terminal controls generation of the first sound and the second sound, based on the data including the first event data and the second event data.

7 Claims, 6 Drawing Sheets

(56) References Cited

OTHER PUBLICATIONS

International Search Report issued in Intl. Appln. No. PCT/JP2021/037184 mailed Dec. 21, 2021. English translation provided.
Written Opinion issued in Intl. Appln. No. PCT/JP2021/037184 mailed Dec. 21, 2021.
Quest Log. "Summary of usage for the comment reader software "Bouyomi-Chan" and link method with comment viewer". Sep. 1, 2020. Online, Internet: https://quest-log.com/bouyomichan-howto/. English translation provided.
Office Action issued in Japanese Appln. No. 2024-007460, dated Dec. 5, 2024. English machine translation provided.
"Challenge the game live with YouTube distribution function!", Mr. PC, Japan, Shinyusha Co., Ltd., Jul. 25, 2019, vol. 10, No. 9, pp. 80-83. English translation provided.
Office Action issued in Chinese Appln. No. 202180067545.2, mailed Apr. 29, 2025.
Office Action issued in Chinese Appln. No. 202180067545.2 mailed Oct. 20, 2025.

\* cited by examiner

COMMUNICATION METHOD AND SYSTEM

CROSS-REFERENCE TO RELATED APPLICATIONS

The present application is a continuation application of International Application No. PCT/JP2021/037184, filed Oct. 7, 2021, which claims priority to JP Patent Application No. 2020-171116, filed Oct. 9, 2020. The contents of these applications are incorporated herein by reference.

BACKGROUND

Technological Field

The present disclosure relates to a communication method and system for exchanging information via a server between a plurality of users located apart from each other.

Background Information

In situations where multiple users enjoy a common object, such as watching a play or musical performance, listening to a lecture, watching a sporting event, karaoke, and the like, sounds emitted by users such as clapping are an effective means of enlivening the scene. Therefore, Japanese Unexamined Patent Application Publication, First Publication No. H09-26796 (hereinafter referred to as Patent Document 1) discloses a technique of recording clapping sounds together with karaoke music on a recording medium and playing back the clapping sounds together with the karaoke music from the recording medium.

SUMMARY

However, in the technique described in Patent Document 1, the clapping sound played back along with the karaoke music is a pre-recorded fixed sound, which is insufficient as a means for livening up the scene. Multiple users enjoying a common object may wish to share the real-time clapping sounds of each user. However, in the case of theatrical performances, musical performances, lectures, sports, and the like, a plurality of users located apart from each other may enjoy viewing a common object. In such a case, the users cannot share each other's clapping sounds because they are far from each other.

The present disclosure has been made in view of the above circumstances. One example of the object of the present disclosure is to provide a technical means that allows multiple users who want to make sounds such as clapping sounds to share their sounds with each other.

A communication method according to an aspect of the present disclosure includes: transmitting, by a first terminal and to a server, first event data instructing generation of a first sound; transmitting, by a second terminal and to the server, second event data instructing generation of a second sound; transmitting, by the server and to the first terminal, data including the first event data and the second event data; and controlling, by the first terminal, generation of the first sound and the second sound based on the data including the first event data and the second event data.

A system according to an aspect of the present disclosure includes a first terminal, a second terminal, and a server. The first terminal is configured to transmit first event data instructing generation of a first sound to the server. The second terminal is configured to transmit second event data instructing generation of a second sound to the server. The server is configured to transmit data including the first event data and the second event data to the first terminal. The first terminal is configured to control generation of the first sound and the second sound based on the data including the first event data and the second event data.

DETAILED DESCRIPTION OF THE EMBODIMENTS

Hereinbelow, embodiments of the present disclosure will be described with reference to the drawings.

Figure 1:
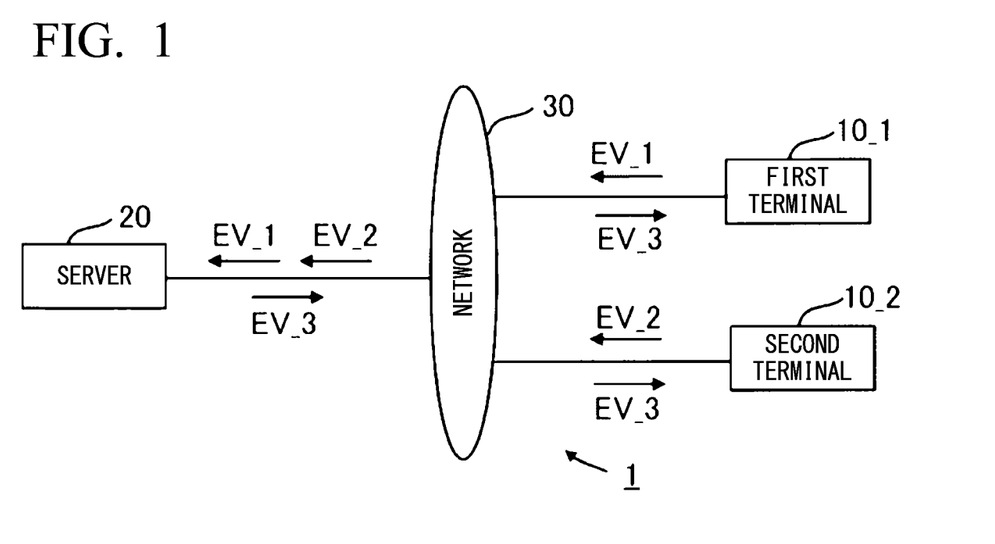
FIG. 1 is a block diagram showing the configuration of the communication system according to an embodiment of the disclosure.

FIG. 1 is a block diagram showing the configuration of a communication system 1, which is an embodiment of the disclosure. As shown in FIG. 1, the communication system 1 includes a first terminal 10_1 and a second terminal 10_2 connected to a network 30 such as the Internet, and a server 20.

In this communication system 1, the server 20 transmits motion image data (including sound data) of various live broadcast programs such as plays, musical performances, and lectures to the first terminal 10_1 and the second terminal 10_2.

The first terminal 10_1 receives data from the server 20 and reproduces the live program. During this reproduction, the first terminal 10_1 generates first event data EV_1 instructing the generation of clapping sounds according to the user's operation, and transmits the first event data EV_1 to the server 20. Similarly, the second terminal 10_2 receives data from the server 20 and reproduces the live program. During this reproduction, the second terminal 10_2 generates second event data EV_2 instructing the generation of clapping sounds according to the user's operation, and transmits the second event data EV_2 to the server 20.

The server 20 generates third event data EV_3 including the first event data EV_1 received from the first terminal 10_1 and the second event data EV_2 received from the second terminal 10_2, and transmits this third event data EV_3 to the first terminal 10_1 and the second terminal 10_2.

Each of the first terminal 10_1 and second terminal 10_2 generates clapping sounds according to the third event data EV_3 received from server 20. In this way, in the communication system 1, the user of the first terminal 10_1 and the user of the second terminal 10_2 can share the clapping sounds that they each instructed to be produced while viewing a common live broadcast program.

The above is the outline of the communication system 1 according to the present embodiment. In FIG. 1, while only two terminals 10_1 and 10_2 are shown in order to prevent the drawing from becoming complicated, the number of terminals that receive a live program from the server 20 and transmit to the server 20 event data instructing the production of clapping sounds may be three or more.

Figure 2:
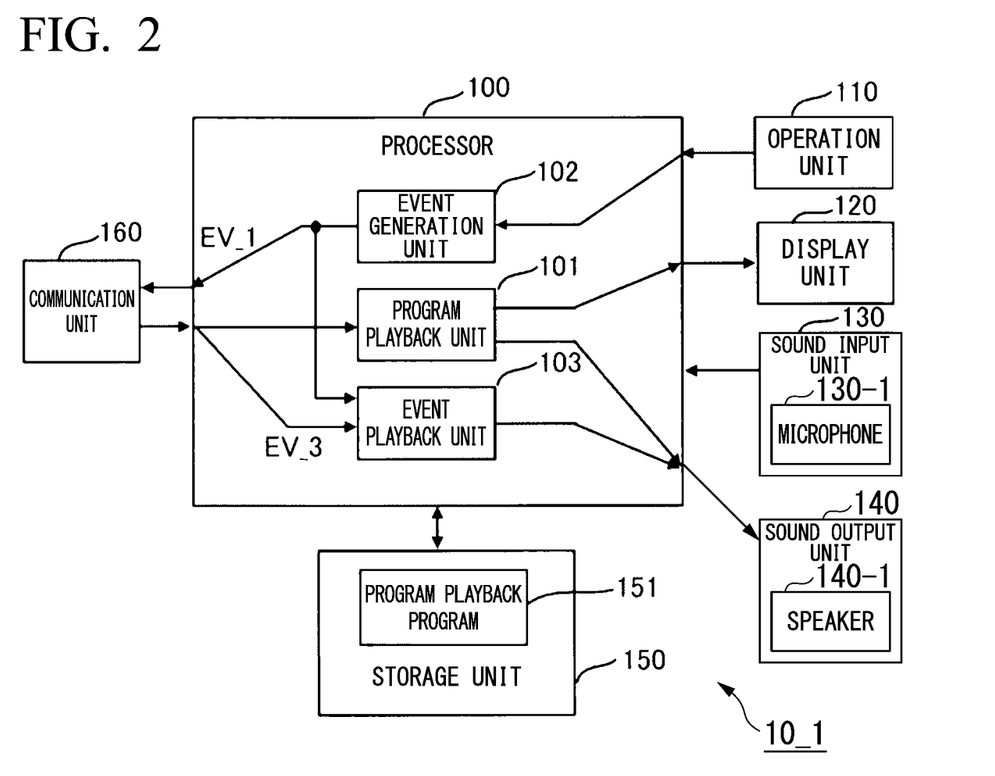
FIG. 2 is a block diagram showing the configuration of a terminal according to the embodiment of the disclosure.

FIG. 2 is a block diagram showing a configuration example of the first terminal 10_1 in the present embodiment. Although not shown, the second terminal 10_2 also has the same configuration as the first terminal 10_1. The first terminal 10_1 is a computer with a communication function, such as a personal computer or a smartphone. As shown in FIG. 2, the first terminal 10_1 has a processor 100, an operation unit 110, a display unit 120, a sound input unit 130, a sound output unit 140, a storage unit 150, and a communication unit 160.

The processor 100 is a control center that controls each part of the first terminal 10_1. The operation unit 110 is a means for receiving operations for giving various instructions to the processor 100, and includes various operators such as a keyboard and a mouse. The display unit 120 is means for displaying various kinds of information, and includes, for example, a liquid crystal display panel. When the first terminal 10_1 is a terminal such as a smartphone, the operation unit 110 and the display unit 120 may be touch panels having both functions. The sound input unit 130 is means for collecting sounds from the outside world and providing the sounds to the processor 100, and is composed of a microphone 130-1. The sound output unit 140 is means for outputting electric signals provided from the processor 100 to the outside world as sound, and is composed of a speaker 140-1. The storage unit 150 has a volatile storage unit such as RAM and a nonvolatile storage unit such as ROM and a hard disk. Volatile storage is used by the processor 100 as a work area. Various programs executed by the processor 100 and various control data used by the processor are stored in the nonvolatile storage unit. The communication unit 160 is a means for controlling communication between the processor 100 and other devices connected to the network 30.

In this embodiment, when the first terminal 10_1 accesses the server 20 to start receiving motion image data of a live broadcast program, prior to starting reception of the motion image data, the first terminal 10_1 downloads a program playback program 151 from the server 20 and stores the program playback program 151 in the volatile storage unit of the storage unit 150. The processor 100 functions as a program playback unit 101, an event generation unit 102 and an event playback unit 103 by executing this program playback program 151.

The program playback unit 101 receives motion image data of a live broadcast program from the server 20 via the communication unit 160, and generates (plays) the live broadcast program based on the motion image data. More specifically, the program playback unit 101 displays an image indicated by the received motion image data on the display unit 120 and emits sound indicated by the motion image data from the sound output unit 140.

The event generation unit 102 generates first event data EV_1 instructing the production of clapping sounds according to an operation on the operation unit 110 during playback of the live broadcast program. In the present embodiment, the screen shown in FIG. 3 is displayed on the display unit 120 in order to receive various instructions such as an instruction to produce a clapping sound.

Figure 3:
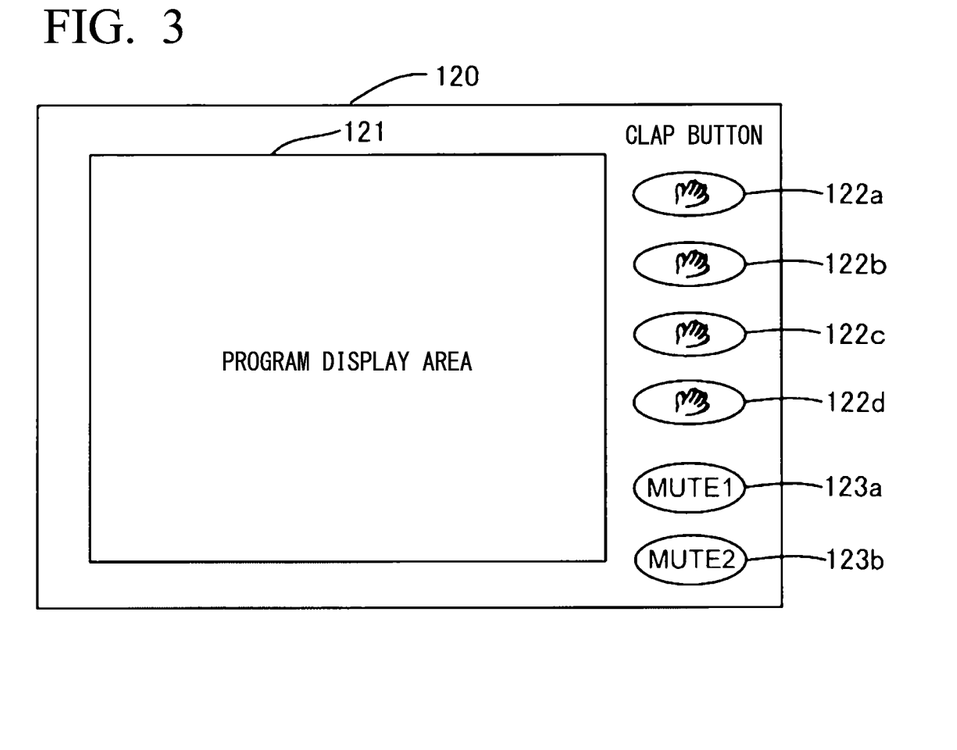
FIG. 3 is a diagram showing a display screen of the terminal shown in FIG. 2.

In FIG. 3, in the program display area 121, an image of a live broadcast program being played by the program playback unit 101 is displayed. On the right side of the program display area 121 on the display screen of the display unit 120, clap buttons 122a, 122b, 122c and 122d, and a first mute button 123a and a second mute button 123b are displayed.

The clap buttons 122a, 122b, 122c and 122d are respectively associated with clapping sounds a, b, c and d having different sound waveforms or production modes. For example, the clapping sound a may be a clapping sound that sounds many times at short time intervals. The clapping sound b may be a clapping sound that sounds a small number of times at long time intervals. The user can instruct the event generation unit 102 to produce a desired clapping sound by instructing (selecting) one of the clap buttons 122a to 122d with a pointing device such as a mouse.

Figure 4:
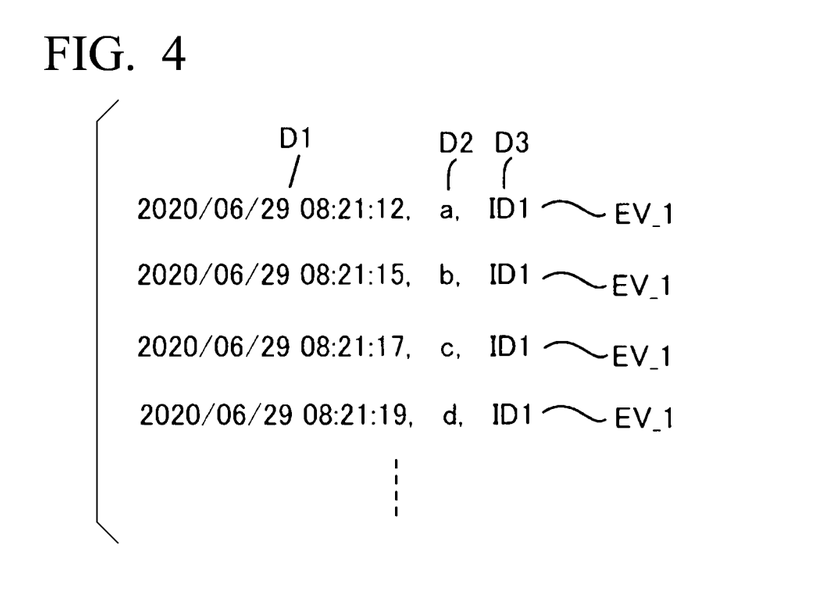
FIG. 4 is a diagram showing first event data generated in the terminal shown in FIG. 2.

FIG. 4 illustrates the first event data EV_1 generated by the event generation unit 102. As shown in FIG. 4, one piece of first event data EV_1 is text data including generation time data D1, sound type data D2, and terminal identification data D3. In other words, the first event data EV_1 may include an instruction to cause the clapping sound indicated by the sound type data D2 to be produced at the time indicated by the time generation time data D1. The first event data EV_1 does not include clapping sound data. Similarly, the second event data EV_1 and the third event data EV_3 do not include clapping sound data.

The generation time data D1 is data indicating the time of generation of the sound production instruction, that is, the time when any one of the clap buttons 122a to 122d is selected. In the present embodiment, the time at which the sound production instruction is generated is the time on the time axis in which the program provided by the server 20 progresses, that is, the in-program time (the time indicating the current time relative to the start time of the program, or the elapsed time of the program).

Various forms of means may be used as means for determining such in-program time. In a preferred embodiment, the server 20 transmits information indicating the start of the program to the first terminal 10_1 and the second terminal 10_2 at the start timing of the live broadcast of the program. Each of the first terminal 10_1 and the second terminal 10_2 initializes their respective in-program time by receiving this information. Subsequently, each of the first terminal 10_1 and the second terminal 10_2 updates their respective in-program time as time passes.

In another preferred embodiment, when broadcasting (transmitting) a live program, the server 20 multiplexes the in-program time with the motion image data of the live program and transmits the data to the first terminal 10_1 and the second terminal 10_2. Each of the first terminal 10_1 and the second terminal 10_2 extracts the in-program time data from the motion image data of the program currently being played back, and uses the data to generate the first event data EV_1. In the present embodiment, the in-program time is determined according to this aspect. When one of the clap buttons 122a to 122d is selected, the event generation unit 102 generates the generation time data D1 indicating the in-program time at that time.

The sound type data D2 is data indicating the type of clapping sound instructed to be produced. When the clap button 122a is selected, the sound type data D2 becomes data indicating the clapping sound a. When the clap button 122b is selected, the sound type data D2 becomes data indicating the clapping sound b. When the clap button 122c is selected, the sound type data D2 becomes data indicating the clapping sound c. When the clap button 122d is selected, the sound type data D2 becomes data indicating the clapping sound d.

The terminal identification data D3 is information for identifying the terminal that generated the sound production instruction. Since the first event data EV_1 is generated by a sound production instruction to the first terminal 10_1, the terminal identification data D3 is ID1, which is the identification information of the first terminal 10_1. Also, since the second event data EV_2 is generated by a sound production instruction to the second terminal 10_2, the terminal identification data D3 is ID2, which is the identification information of the second terminal 10_2.

The first event data EV_1 generated by the event generation unit 102 is transmitted to the server 20 via the communication unit 160 and is also provided to the event playback unit 103.

The event playback unit 103 has a first function of producing a clapping sound according to the first event data EV_1 generated by the event generation unit 102, and a second function of producing a clapping sound according to the third event data EV_3 received from the server 20 via the communication unit 160. These two functions are controlled based on the states of the first mute flag MUTE1 and the second mute flag MUTE2 set in the volatile storage unit of the storage unit 150.

The first mute flag (cancel flag, stop flag) MUTE1 is a flag indicating whether the event playback unit 103 mutes (cancels, stops) the clapping sound based on the first event data EV_1 (MUTE1=ON) or does not mute the clapping sound (MUTE1=OFF). When one of the clap buttons 122a-122d is selected and the first event data EV_1 is generated, it is determined whether or not to mute the production of the clapping sound based on the first event data EV_1 according to the first mute flag MUTE1.

The second mute flag (cancel flag, abort flag) MUTE2 is a flag indicating whether to mute (cancel, stop) production of the clapping sound based on the third event data EV_3 (MUTE2=ON) or not (MUTE2=OFF). When the first event data EV_1 generated by the event playback unit 102 is transmitted to the server 20 and the first event data EV_1 is received as the third event data EV_3 from the server 20, a determination is made whether or not to mute the production of the clapping sound based on the third event data EV_3 in accordance with the second mute flag MUTE2.

On the display screen of the display unit 120 shown in FIG. 3, the first mute button 123a is lit when the first mute flag MUTE1 is ON, and is extinguished when it is OFF. Also, the second mute button 123b is lit when the second mute flag MUTE2 is ON, and is extinguished when the second mute flag MUTE2 is OFF. The user can switches the first mute flag MUTE1 between ON and OFF by selecting the first mute button 123a with the pointing device. Also, the user can switches the second mute flag MUTE2 between ON and OFF by selecting the second mute button 123b with the pointing device.

In the event playback unit 103, the relationship between the first mute flag MUTE1 and the first function is as follows. When the first mute flag MUTE1 is OFF, the event playback unit 103 generates a sound signal of the clapping sound instructed by the first event data EV_1 at the time of receiving the first event data EV_1 from the event generation unit 102, and causes the sound output unit 140 to produce the clapping sound. When the first mute flag MUTE1 is ON, even if the event playback unit 103 receives the first event data EV_1 from the event generation unit 102, the event playback unit 103 does not cause production of the clapping sound instructed by the first event data EV_1.

In the event playback unit 103, the relationship between the second mute flag MUTE2 and the second function is as follows. In the case of the second mute flag MUTE2 being OFF, upon receiving the third event data EV_3 from the server 20, the event playback unit 103 causes the sound output unit 140 to produce the clapping sound designated by the third event data EV_3 regardless of whether or not the third event data EV_3 is the first event data EV_1 generated by the first event generation unit 102.

In the case of the second mute flag MUTE2 being ON, upon receiving the third event data EV_3 from the server 20, the event playback unit 103 determines whether or not the terminal identification data D3 of the third event data EV_3 indicates the identification information ID1 of the first terminal 10_1, that is, whether or not the third event data EV_3 is the first event data EV_1 generated by the first terminal 10_1. Then, when the third event data EV_3 does not correspond to the first event data EV_1, the event playback unit 103 causes the clapping sound specified by the third event data EV_3 to be produced. When the third event data EV_3 corresponds to the first event data EV_1, the event playback unit 103 does not cause the clapping sound specified by the third event data EV_3 to be produced.

Next, the timing control of the process by which the event playback unit 103 produces clapping sounds based on the third event data EV_3 will be described. The event playback unit 103 controls the timing of production of clapping sounds based on the third event data EV_3 on the basis of the current time (in-program time) and the generation time of the sound production instruction indicated by the third event data EV_3. Further details are as follows.

The event playback unit 103 accumulates the third event data EV_3 received from the server 20 in the storage unit 150, sorts the accumulated plurality of third event data EV_3 in order of generation time indicated by the generation time data D1, and creates a list. Then, the event playback unit 103 extracts each third event data EV_3 from the sorted list of the plurality of third event data EV_3 in order of generation time, and produces clapping sounds according to the extracted third event data EV_3. In order to avoid duplication of explanation, the details of the control of the timing of producing clapping sounds based on the third event data EV_3 will be clarified in the operation explanation of the present embodiment.

Figure 5:
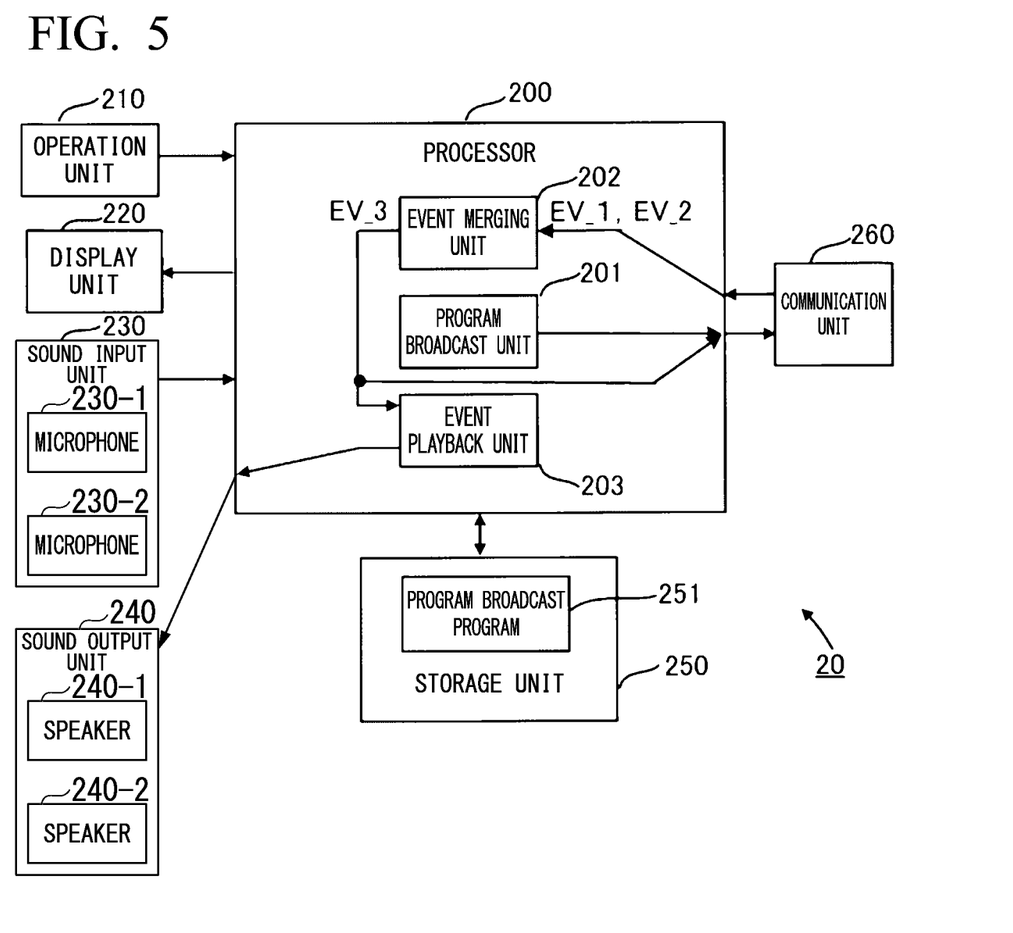
FIG. 5 is a diagram showing the configuration of a server according to the embodiment of the disclosure.

FIG. 5 is a block diagram showing the configuration of the server 20. The server 20 includes a processor 200, an operation unit 210, a display unit 220, a sound input unit 230, a sound output unit 240, a storage unit 250, and a communication unit 260 that are the same as those in the first terminal 10_1 and the second terminal 10_2.

A program broadcast program 251 is stored in the non-volatile storage unit of the storage unit 250. The processor 200 functions as a program broadcast unit 201, an event merging unit 202 and an event playback unit 203 by executing this program broadcast program 251.

The program broadcasting unit 201 transmits the above-described program playback program 151 to the first terminal 10_1 and the second terminal 10_2 requesting reception of the broadcast of a live program, and then transmits the motion image data of the live program.

The event merging unit 202 merges the first event data EV_1 and the second event data EV_2 sent from the first terminal 10_1 and the second terminal 10_2 receiving the broadcast of the program and generates the third event data EV_3.

The event playback unit 203 is a means for controlling the production of clapping sounds based on the third event data EV_3.

In this embodiment, by operating the operation unit 210 or by an instruction from a terminal connected to the network 30, it is possible to set the clapping sound playback mode in the server 20 or cancel the set clapping sound playback mode. The clapping sound playback mode is a mode in which the server 20 produces a clapping sound according to the first event data EV_1 and the second event data EV_2 transmitted from the first terminal 10_1 and the second terminal 10_2.

In a state where the clapping sound playback mode is set in the server 20, the event playback unit 203 causes the sound output unit 240 to produce clapping sounds according to the third event data EV_3. More specifically, the event playback unit 203 accumulates the third event data EV_3 in the storage unit 250, and sorts the accumulated plurality of third event data EV_3 in order of generation time indicated by the generation time data D1. Then, the event playback unit 203 extracts each third event data EV_3 from the sorted list of the plurality of third event data EV_3 in order of generation time, and produces clapping sounds according to the extracted third event data EV_3. More specifically, the sound input unit 230 is composed of a plurality of microphones, specifically a microphone 230-1 and a microphone 230-2. The sound input unit 230 may be composed of only one microphone, that is, the microphone 230-1. The sound output unit 240 is composed of a plurality of speakers, specifically a speaker 240-1 and a speaker 240-2. The sound output unit 240 may be composed of only one speaker, that is, the speaker 240-1. As a first example, a case of using one microphone (microphone 230-1) and one speaker (speaker 240-1) will be described. In this case, the speaker 240-1 produces the clapping sound of each third event data EV_3. The sound input unit 230 generates sound data including the clapping sound by the microphone 230-1 picking up the clapping sounds produced by the speaker 240-1. The communication unit 260 transmits the sound data to the first terminal 10_1 and the second terminal 10_2. The first terminal 10_1 and the second terminal 10_2 reproduce the clapping sounds based on the sound data. Here, a reverberant sound occurs by generating clapping sounds through the speaker 240-1. Therefore, the sound data contains reverberant sound. Accordingly, the first terminal 10_1 and second terminal 10_2 can reproduce natural clapping sounds. Next, as a second example, a case of using one microphone (microphone 230-1) and a plurality of speakers (speakers 240-1 and 240-2) will be described. In this case, the speaker 240-1 and the speaker 240-1 generate clapping sounds according to each third event data EV_3. As another example, the speaker 240-1 may only produce clapping sounds in accordance with the third event data EV_3 in which the terminal identification data D3 indicates identification information ID1, and the speaker 240-2 may only produce clapping sounds in accordance with the third event data EV_3 in which the terminal identification data D3 indicates identification information ID2. The microphone 230-1 picks up the clapping sounds produced by the speaker 240-1 and the clapping sounds produced by speaker 240-2, whereby the sound input unit 230 generates sound data including the clapping sounds. The communication unit 260 transmits the sound data to the first terminal 10_1 and the second terminal 10_2. The first terminal 10_1 and the second terminal 10_2 reproduce the clapping sounds based on the sound data. Here, by generating clapping sounds from the speakers 240-1 and 240-2, reverberation sounds corresponding to the difference in the positions of the speakers 240-1 and 240-2 are generated. Accordingly, the first terminal 10_1 and second terminal 10_2 can reproduce clapping sounds including such reverberation sounds. Therefore, users can share more natural clapping sounds. Next, as a third example, a case of using multiple microphones (microphones 230-1 and 230-2) and multiple speakers (speakers 240-1 and 240-2) will be described. In this case, the sound input unit 230 generates sound data based on the sounds picked up by the microphone 230-1 and sound data based on the sounds picked up by the microphone 230-2. The communication unit 260 transmits the sound data based on the sounds picked up by the microphone 230-1 to the first terminal 10_1. Further, the communication unit 260 transmits the sound data based on the sounds picked up by the microphone 230-2 to the second terminal 10_2. Therefore, the first terminal 10_1 and the second terminal 10_2 can reproduce different clapping sounds corresponding to differences in the positions of the microphones 230-1 and 230-2. In the first through third examples, the microphone 230-1 and/or 230-2 and speaker 240-1 and/or 240-2 may be placed in locations subject to environmental noise. In this case, the sound data will contain environmental noise. Accordingly, the first terminal 10_1 and the second terminal 10_2 can reproduce environmental noise together with the clapping sounds. Therefore, users can share more natural clapping sounds.

Figure 6:
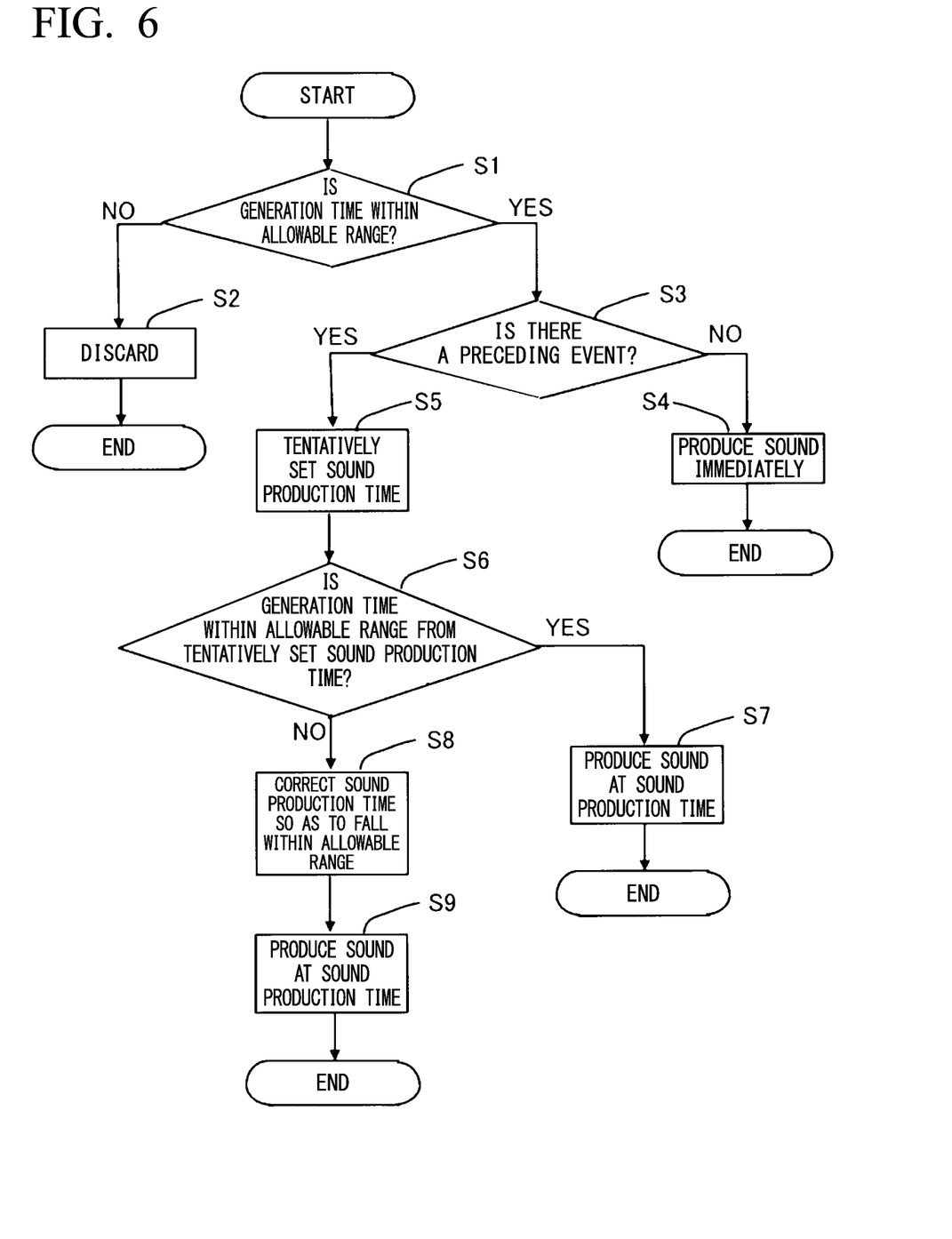
FIG. 6 is a flowchart showing the processing contents of the event playback unit of the first terminal and the second terminal according to the embodiment of the present disclosure.

Next, an operation example of the present embodiment will be described. FIG. 6 is a flowchart showing the processing contents of the event playback unit 103 of the first terminal 10_1 and the second terminal 10_2. The event playback unit 103 repeatedly executes the processing shown in FIG. 6 while the program is being played. As described above, the event playback unit 103 retrieves the sorted third event data EV_3 from the storage unit 150 in order of generation time, and controls the production of clapping sounds. Then, when attempting to retrieve the third event data EV_3 with the earliest generation time remaining in the storage unit 150, the event playback unit 103 determines whether or not the time indicated by the generation time data D1 of the third event data EV_3 is within the allowable range TA with respect to the current in-program time (Step S1). If the determination result is negative, the event playback unit 103 extracts the third event data EV_3 from the list and discards it (Step S2). In other words, the event playback unit 103 does not generate clapping sounds based on the third event data EV_3.

On the other hand, if the determination result is affirmative, the event playback unit 103 determines whether or not there is third event data EV_3 in which clapping sounds was produced that precedes the third event data EV_3 that is about to be retrieved (Step S3). If there is no preceding third event data EV_3, the event playback unit 103 immediately retrieves the third event data EV_3 from the list and causes clapping to be produced based on the third event data EV_3 (Step S4).

When there is preceding third event data EV_3, the event playback unit 103 finds time t2−t1 which is the difference between generation time t1 indicated by the generation time data D1 of the preceding third event data EV_3 and the generation time t2 indicated by the generation time data D1 of the third event data EV_3 that is being retrieved. Moreover, the event playback unit 103 tentatively sets the time t2', which is the time t2−t1 after the time t1' of the occurrence of the clapping sound based on the preceding third event data EV_3, to the time of generation of the clapping sound based on the third event data EV_3 that is being retrieved (Step S5).

Next, the event playback unit 103 determines whether or not the generation time t2 of the third event data EV_3 to be extracted is within the allowable range TA with respect to the tentatively set generation time t2' (Step S6). That is, the event playback unit 103 determines whether or not the time difference between the generation time t2 of the third event data EV_3 to be extracted and the tentatively set generation time t2' is within the allowable range TA. If the determination result is affirmative, the event playback unit 103 waits until the in-program time reaches the generation time t2', retrieves the third event data EV_3 from the list at the generation time t2', and causes the clapping sound to be produced based on the third event data EV_3 (Step S7).

On the other hand, if the generation time t2 of the third event data EV_3 to be extracted is not within the allowable range TA with respect to the temporarily set generation time t2', the event playback unit 103 advances the generation time t2' so that the generation time t2 falls within the allowable range TA for the generation time t2' (Step S8). The event playback unit 103 waits until the in-program time reaches this advanced generation time t2', retrieves the third event data EV_3 from the list at the generation time t2', and causes the clapping sound to be produced based on the third event data EV_3 (Step S9).

Figure 7:
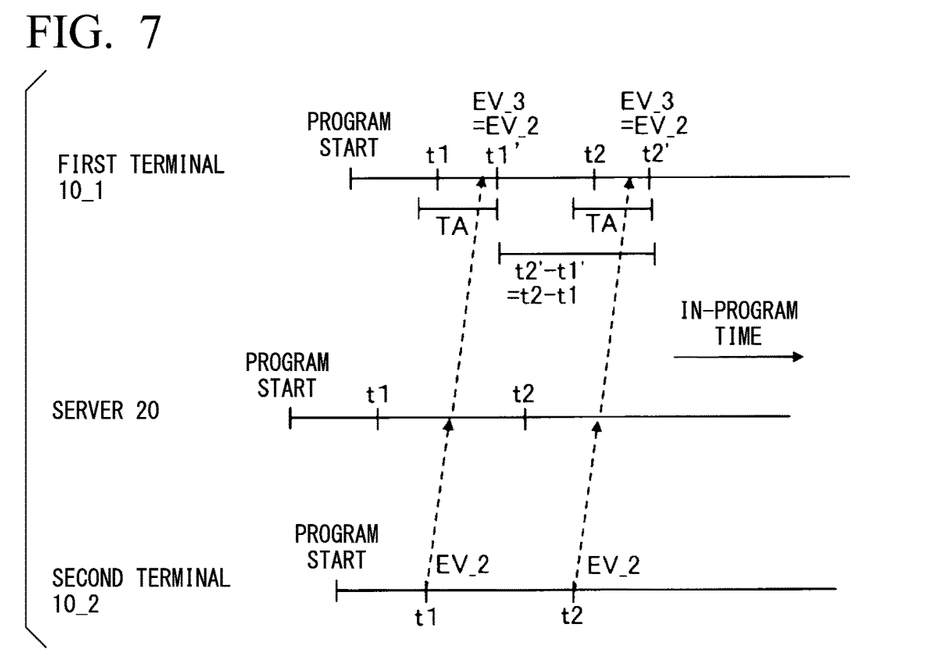
FIG. 7 is a time chart showing an operation example according to the embodiment of the disclosure.
Figure 8:
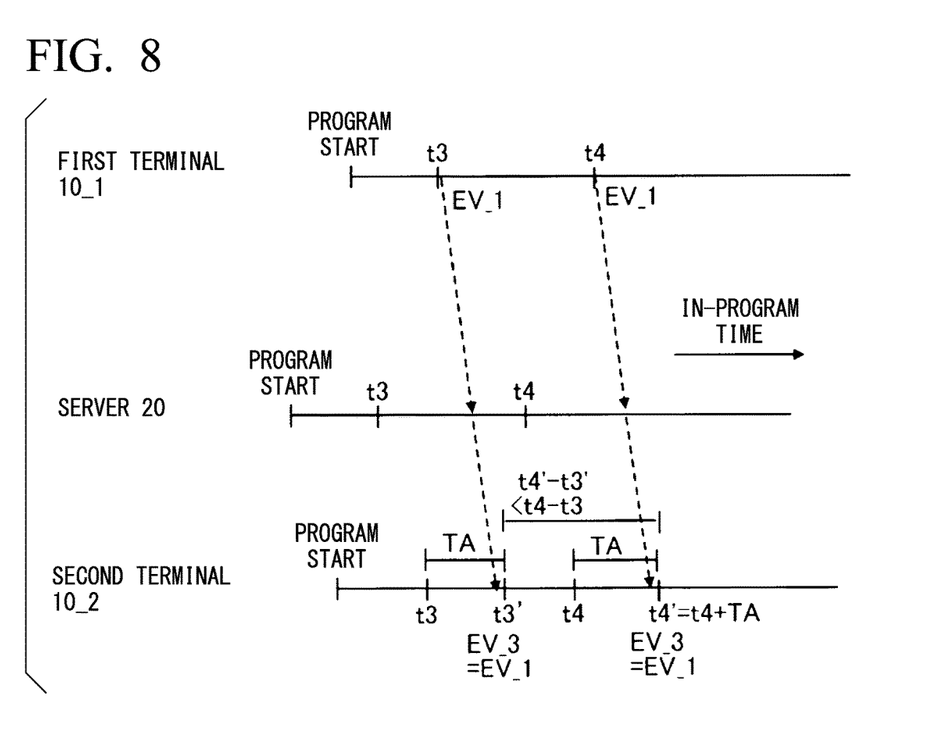
FIG. 8 is a time chart showing an operation example according to the embodiment of the disclosure.

FIGS. 7 and 8 are time charts showing an operation example of this embodiment. In this operation example, the transmission delay time from the server 20 to the first terminal 10_1 is longer than the transmission delay time from the server 20 to the second terminal 10_2. Therefore, the first terminal 10_1 starts playing the live broadcast program later than the second terminal 10_2. Note that in FIGS. 6 and 7, in order to facilitate understanding of the operation of this embodiment, the transmission delays between the server 20 and each of the first terminal 10_1 and the second terminal 10_2 are illustrated with more exaggeration than the time interval generated by each of the first event data EV_1, the second event data EV_2 and the third event data EV_3.

In FIG. 7, in the second terminal 10_2, the second event data EV_2 is generated at the generation time (in-program time) t1 after the program playback is started, and the second event data EV_2 passes through the server 20 to become the third event data EV_3 and is transmitted to the first terminal 10_1. The generation time data D1 of this third event data EV_3 indicates the generation time t1.

In the first terminal 10_1, the third event data EV_3 is accumulated in the storage unit 150 at the time after the generation time (in-program time) t1. In this operation example, there is no third event data EV_3 preceding this third event data EV_3. Further, the generation time t1 indicated by the generation time data D1 of this third event data EV_3 is within the allowable range TA with respect to the current generation time (in-program time) t1'. Therefore, the event playback unit 103 retrieves this third event data EV_3 from the storage unit 150 at the generation time (in-program time) t1' immediately after the accumulation of the third event data EV_3 in the storage unit 150, and causes the production of a clapping sound based on the third event data EV_3.

Subsequently, in the second terminal 10_2, the second event data EV_2 is generated at the generation time (in-program time) t2, and this second event data EV_2 passes through the server 20 to become the third event data EV_3 and is transmitted to the first terminal 10_1. The generation time data D1 of this third event data EV_3 indicates the generation time t2.

In the first terminal 10_1, the third event data EV_3 is accumulated in the storage unit 150 at the time after the generation time (in-program time) t2. Here, the sound of clapping based on the third event data EV_3 preceding this third event data EV_3 is produced at time t1'. Then, time t2', which is time t2−t1 from time t1', is tentatively set as the generation time. In this operation example, the generation time t2 indicated by the generation time data D1 of the third event data EV_3 is within the allowable range TA with respect to the temporarily set generation time t2'. Therefore, the event playback unit 103 retrieves this third event data EV_3 from the storage unit 150 at the generation time t2', and causes the production of a clapping sound based on the third event data EV_3.

In FIG. 8, the first event data EV_1 is generated in the first terminal 10_1 at the generation time (in-program time) t3, and this first event data EV_1 passes through the server 20 to become the third event data EV_3 and is transmitted to the second terminal 10_2. The generation time data D1 of this third event data EV_3 indicates the generation time (in-program time) t3. Further, in the first terminal 10_1, the first event data EV_1 is generated at the generation time (in-program time) t4 after the generation time (in-program time) t3, and this first event data EV_1 also becomes the third event data EV_3 and is transmitted to the second terminal 10_2. The generation time data D1 of this third event data EV_3 indicates the generation time t4.

In the second terminal 10_2, the third event data EV_3 is accumulated in the storage unit 150 at the time after the generation time (in-program time) t3. The processing for the third event data EV_3 is the same as the processing performed for the third event data EV_3 received by the event playback unit 103 of the first terminal 10_1 after the time t1 in the example of FIG. 7.

In this operation example, the program playback start time of the second terminal 10_2 is earlier than the program playback start time of the first terminal 10_1. Therefore, the time difference between the generation time indicated by the generation time data D1 of the third event data EV_3 received by the second terminal 10_2 and the in-program time at which the third event data EV_3 is received by the second terminal 10_2 is greater than the time difference between the generation time indicated by the generation time data D1 of the third event data EV_3 received by the first terminal 10_1 and the in-program time at which the third event data EV_3 is received by the first terminal 10_1. Therefore, in the second terminal 10_2, when the clapping sound generation time is provisionally set based on the third event data EV_3, it is more likely that the generation time needs to be corrected more than in the case of the first terminal 10_1.

In FIG. 8, when the second terminal 10_2 receives the third event data EV_3 including the generation time data D1 indicating the generation time t4, the generation time t4' that follows the generation time t3' of the clapping sound based on the preceding third event data EV_3 by time t4−t3 is provisionally set as the generation time of the clapping sound based on this third event data EV_3 (generation time t4). However, in this operation example, the generation time t4 indicated by the third event data EV_3 is not within the allowable range TA with respect to the temporarily set occurrence time t4'. Therefore, in this operation example, the event playback unit 103 corrects the generation time t4' to a time earlier than usual, that is, a time that follows the generation time t4 indicated by the third event data EV_3 by the allowable range (allowable time) TA. In this case, at the generation time t4' satisfying "t4'−t3'<t4−t3", clapping sounds are produced based on the third event data EV_3.

As described above, in the present embodiment, the second terminal 10_2 produces clapping sounds based on a sound production instruction almost synchronously with a sound production instruction issued by the first terminal 10_1. Further, in the first terminal 10_1, clapping sounds are produced based on a sound production instruction almost synchronously with a sound production instruction issued by the second terminal 10_2. Therefore, the user of the first terminal 10_1 and the user of the second terminal 10_2 can share the clapping sounds that they instructed to be produced.

Although not illustrated, in FIGS. 7 and 8, the first event data EV_1 transmitted by the first terminal 10_1 passes through the server 20 to become third event data EV_3 and is transmitted to the first terminal 10_1. The second event data EV_2 transmitted by the second terminal 10_2 passes through the server 20 to become third event data EV_3 and is transmitted to the second terminal 10_2. The processing of the third event data EV_3 received by the first terminal 10_1 and the second terminal 10_2 in this manner differs according to the ON/OFF state of the second mute flag MUTE2.

When the second mute flag MUTE2 is OFF, the event playback unit 103 of the first terminal 10_1 causes clapping sounds to be produced based on all the pieces of third event data EV_3 regardless of whether the terminal identification data D3 included in the third event data EV_3 indicates the identification information ID1 of the first terminal 10_1. The same applies to the second terminal 10_2.

When the second mute flag MUTE2 is ON, the event playback unit 103 of the first terminal 10_1 determines whether or not the terminal identification data D3 included in the third event data EV_3 indicates the identification information ID1 of the first terminal 10_1. The event playback unit 103 of the first terminal 10_1 causes the production of clapping sounds only for the third event data EV_3 whose terminal identification data D3 does not indicate identification information ID1, while not causing the production of clapping sounds for the third event data EV_3 whose terminal identification data D3 indicates the identification information ID1.

Figure 9:
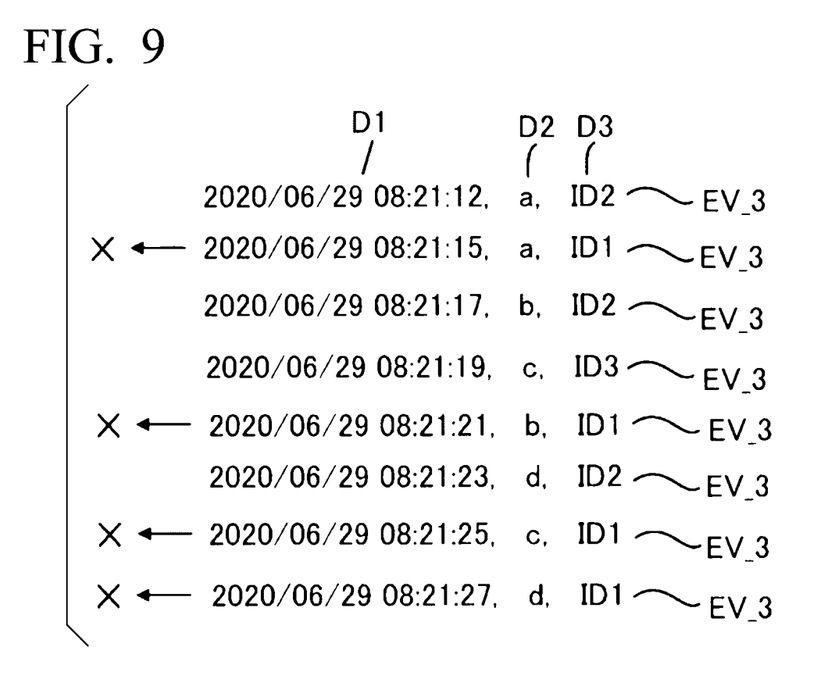
FIG. 9 is a diagram showing an operation example according to the embodiment of the disclosure.

FIG. 9 is a diagram showing an operation example of the first terminal 10_1 in this case. FIG. 9 shows a list of third event data EV_3 received by the first terminal 10_1. When the second mute flag MUTE2 is ON, as shown in FIG. 9, the third event data EV_3 whose terminal identification data D3 indicates the identification information ID1 is excluded from the production of clapping sounds. In the example of FIG. 9, "X" means exclusion.

Assuming the following comparative example, the effect of this aspect is easy to understand. In the comparative example, a server receives instructions to produce clapping sounds from a plurality of terminals, mixes the plurality of clapping sounds, and transmits the mixture to the plurality of terminals. In this comparative example as well, users of a plurality of terminals can share clapping sounds that are produced according to the sound production instructions from each terminal. However, in the comparative example, when each of the plurality of terminals produces a clapping sound in response to the sound production instruction from the user, the clapping sound is emitted twice, that is, that clapping sound made in response to the production instruction from the user, and the clapping sound made according to the instruction transmitted from the server. Production of such clapping sounds imparts a sense of discomfort to the user.

On the other hand, in the present embodiment, when the first mute flag MUTE1 is turned OFF and the second mute flag MUTE2 is turned ON in the first terminal 10_1, in the event of a sound production instruction being given to the first terminal 10_1, clapping sound production based on this sound production instruction is only performed at the first terminal 10_1 at the time of this sound production instruction, and even if the first event data EV_1 based on this sound production instruction returns to the first terminal 10_1 as the third event data EV_3 via the server 20, a clapping sound based on this third event data EV_3 will not be produced. Therefore, according to the present embodiment, it is possible to avoid the situation in which a clapping sound is generated twice as in the comparative example.

As described above, according to the present embodiment, the first terminal 10_1 transmits to the server 20 the first event data EV_1 instructing the generation of a clapping sound. The second terminal 10_2 transmits to the server 20 the second event data EV_2 instructing the generation of a clapping sound. The server 20 transmits third event data EV_3 including first event data EV_1 and the second event data EV_2 to the first terminal 10_1. The first terminal 10_1 produces clapping sounds according to the third event data EV_3. For this reason, the user of the first terminal 10_1 can share clapping sounds with the user of the second terminal 10_2. In addition, in the present embodiment, since the third event data EV_3 which consists of a small amount of data is sent from the server 20 to the first terminal 10_1, compared to the case of sending sound data of clapping sounds, the transmission delay of data from the server 20 to the first terminal 10_1 is reduced. Therefore, the first terminal 10_1 can produce clapping sounds at an appropriate timing with little delay from the time of generation of the sound production instruction at the second terminal 10_2.

Further, in the above embodiment, the server 20 broadcasts (transmits) programs to the first terminal 10_1 and the second terminal 10_2. The first event data EV_1, the second event data EV_2, and the third event data EV_3 include generation time data D1 indicating the generation time of the sound production instruction on the time axis along which the program progresses. The event playback unit 103 of the first terminal 10_1 controls the timing of production of clapping sounds based on the third event data EV_3, on the basis of the current time and the generation time of the sound production instruction indicated by the generation time data D1 of the third event data EV_3. Therefore, according to the present embodiment, the event playback unit 103 of the first terminal 10_1 can, almost synchronously with the generation of a sound production instruction in the second terminal 10_2, cause the production of a clapping sound based on the sound production instruction.

In addition, in the present embodiment, the event playback unit 103 of the first terminal 10_1 controls the processing of sound production based on the event data corresponding to the first event data EV_1 transmitted from the first terminal 10_1 among the third event data EV_3 in accordance with operations to the first terminal 10_1. Specifically, when the second mute flag MUTE2 is set to ON by operating the operation unit 110, the event playback unit 103 of the first terminal 10_1 excludes from the objects of sound production for event data corresponding to the first event data EV_1 transmitted from the first terminal 10_1 among the third event data EV_3. Therefore, according to the present embodiment, it is possible to avoid a situation in which the first terminal 10_1 generates a clapping sound twice based on the same sound production instruction.

Further, in the present embodiment, when the clapping sound playback mode is set, the event playback unit 203 of the server 20 produces a clapping sound according to the third event data EV_3 generated by the event merging unit 202. Therefore, the user of the server 20 can share the clapping sound with each user of the first terminal 10_1 and the second terminal 10_2.

Although the embodiment of the present disclosure have been described above, the embodiment of the present disclosure is not limited thereto. Another embodiment of the disclosure will be described.

(1) The terminal may be provided with a means for preventing the terminal from generating clapping sounds that are undesirable for the user. For example, when the server 20 broadcasts a program of a lecture to each terminal, if there is a user who claps at a timing when many users do not make a clapping sound, such as a when a lecturer is speaking, the clapping sound of that user are made not to be produced in terminals. This requires a means of identifying the terminal of the user emitting the objectionable clapping sound. Regarding this means, the following aspect may be adopted.

Aspect 1

The event playback unit 103 displays dots associated with each terminal on the display screen of the display unit 120. When a clapping sound is produced according to the third event data EV_3, the event playback unit 103 lights the dot associated with the terminal specified by the terminal identification data D3 of the third event data EV_3. A user indicates a dot that lights up at an unfavorable timing with a pointing device. After that, the event playback unit 103 excludes the third event data EV_3 including the terminal identification data D3 of the terminal corresponding to the designated dot from the objects of clapping sound production.

Aspect 2

The event playback unit 103 analyzes the generation timing of the clapping sound based on the third event data EV_3 for a certain period of time. A large number of clapping sounds are generated in a concentrated manner at approximately the same time. On the other hand, there may be a minority of clapping sounds (less than a predetermined number of sound production instructions) generated at times separated from the generation times of the majority of clapping sounds. The terminal that is the source of the instructions to produce such a minority clapping sound is determined. The third event data EV_3 including the terminal identification data D3 of this terminal is excluded from the objects of clapping sound production.

(2) In the above embodiment, the server 20 provides live programs to the first terminal 10_1 and the second terminal 10_2, but the present disclosure is not limited to this embodiment. As one aspect of providing the program, an aspect that provides recorded programs in response to a request from the terminal may be adopted.

In this aspect, when recording a live broadcast program, the server 20 stores third event data EV_3 combining the first event data EV_1 received from the first terminal 10_1 and the second event data EV_2 received from the second terminal 10_2. Then, when the server 20 receives a recording/playback request from a terminal, the server 20 merges the event data of the clapping sound production instruction received from that terminal with the saved third event data EV_3 to create a new third event data EV_3', which is then transmitted to the terminal. According to this aspect, the user who requested the recording/playback can share clapping sounds with the user who watched the live broadcast program.

(3) In the above embodiment, a plurality of users share clapping sounds, but the sounds to be shared are not limited to clapping sounds. For example, when a plurality of users see a play such as a kabuki performance, they may share their shouts to the actors.

(4) In each of the first terminal 10_1 and the second terminal 10_2, aspects of sound production processing based on the third event data EV_3 such as volume balance, localization, timbre, length of time, etc. for each type of the clapping sounds a, b, c, and d may be controlled by operation of the operation unit 110.

(5) In the above-described embodiment, the event playback unit 103 of the first terminal 10_1 excluded the event data corresponding to the first event data EV_1 transmitted from the first terminal 10_1 among the third event data EV_3 from the objects of sound production. However, the aspect of sound production control based on the event data corresponding to the first event data EV_1 is not limited thereto. For example, the volume of the clapping sound generated based on the event data corresponding to the first event data EV_1 may be lowered.

(6) The server 20 may transmit data including sound data (sound signals) of clapping sounds as the third event data EV_3 to the first terminal 10_1 and the second terminal 10_2. In this case, the first terminal 10_1 and the second terminal 10_2 generate clapping sounds based on the sound data of the clapping sounds.

The present disclosure may be applied to a communication method.

What is claimed is:

1. A communication method comprising:
    transmitting, by a first terminal and to a server, first event data instructing generation of a first sound;
    transmitting, by a second terminal and to the server, second event data instructing generation of a second sound;
    transmitting, by the server and to the first terminal, data including the first event data and the second event data;
    controlling, by the first terminal, generation of the first sound and the second sound based on the data including the first event data and the second event data; and
    transmitting, by the server, a program to the first terminal and the second terminal,
    wherein the first event data includes an instruction to cause the first sound to be produced at a first elapsed time of the program, and the second event data includes an instruction to cause the second sound to be produced at a second elapsed time of the program, and
    wherein controlling the generation of the first sound and the second sound includes controlling a timing of the generation of the first sound and the second sound based on a current time of the program being played on the first terminal, the first elapsed time, and the second elapsed time.

2. The communication method according to claim 1, wherein controlling the generation of the first sound and the second sound includes controlling the generation of the first sound according to an operation received by the first terminal.

3. The communication method according to claim 1, wherein transmitting the data including the first event data and the second event data to the first terminal includes transmitting audio data of the first sound and audio data of the second sound from the server to the first terminal, and wherein controlling the generation of the first sound and the second sound includes:

generating the first sound based on the audio data of the first sound, and generating the second sound based on the audio data of the second sound.

4. The communication method according to claim 1, wherein the first event data instructing generation of the first sound and the second event data instructing generation of the second sound are respectively transmitted, to the server, by the first terminal and the second terminal in a case where the same broadcast program is being displayed on both of the first terminal and the second terminal.

5. A communication method comprising:

transmitting, by a first terminal and to a server, first event data instructing generation of a first sound;

transmitting, by a second terminal and to the server, second event data instructing generation of a second sound;

transmitting, by the server and to the first terminal, data including the first event data and the second event data; and controlling, by the first terminal, generation of the first sound and the second sound based on the data including the first event data and the second event data, wherein controlling the generation of the first sound and the second sound includes controlling a mode of the generation of the first sound and the second sound according to an operation received by the first terminal.

6. A communication method comprising:

transmitting, by a first terminal and to a server, first event data instructing generation of a first sound;

transmitting, by a second terminal and to the server, second event data instructing generation of a second sound;

transmitting, by the server and to the first terminal, data including the first event data and the second event data; and controlling, by the first terminal, generation of the first sound and the second sound based on the data including the first event data and the second event data, wherein the first event data includes information indicating a type of the first sound, and the second event data includes information indicating a type of the second sound, and wherein controlling the generation of the first sound and the second sound includes:

controlling a mode of the generation of the first sound according to the type of the first sound; and controlling a mode of the generation of the second sound according to the type of the second sound.

7. A communication method comprising:

transmitting, by a first terminal and to a server, first event data instructing generation of a first sound;

transmitting, by a second terminal and to the server, second event data instructing generation of a second sound;

transmitting, by the server and to the first terminal, data including the first event data and the second event data;

controlling, by the first terminal, generation of the first sound and the second sound based on the data including the first event data and the second event data;

receiving, by both of the first terminal and the second terminal, image data from the server; and reproducing, by both of the first terminal and the second terminal, a program based on the image data received from the server, wherein the first event data instructing generation of the first sound and the second event data instructing generation of the second sound are respectively transmitted, to the server, by the first terminal and the second terminal during the reproduction of the program, and wherein the image data received from the server is image data of a live program.

* * * * *